United States Patent Office 3,404,105
Patented Oct. 1, 1968

3,404,105
FOAMING PROCESS FOR POLYURETHANE IN THE PRESENCE OF PORE REGULATORS
Gerd Rossmy, Essen-Werden, Germany, assignor to Th. Goldschmidt A.G., Essen, Germany
No Drawing. Filed Feb. 9, 1965, Ser. No. 431,435
Claims priority, application Germany, Feb. 24, 1964, G 39,929
12 Claims. (Cl. 260—2.5)

ABSTRACT OF THE DISCLOSURE

Foaming processes for preparing elastomeric polyurethane foam from a reaction mixture of polyols, organic polyisocyanates and water, wherein the foam is stabilized by a surface active agent admixed with the reaction mixture. In accordance with the invention, the reaction mixture, in addition to the foam stabilizing surface active agent is admixed with a pore regulator for the foam. The pore regulator is a liquid organopolysiloxane having a viscosity, at room temperature, of less than 1,000 cp., and of the formula $$R_xSiZ_yO_{2-\frac{x+y}{2}}$$

wherein R is hydrocarbon, Z is one of OH,

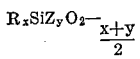

wherein R' is hydrogen or hydrocarbon, OR' wherein R' is hydrocarbon,

wherein R' is hydrocarbon or hydrogen, or a mixture of such groups, N has a value of between 1.0 to 2.1, $y$ has the value of between 0.01 to 1.0 and $x+y=1.55$ to 3.

---

This invention generally relates to polyurethane foams and is particularly directed to an improvement in manufacturing processes for flexible or elastomeric polyurethane foams produced by the reaction of polyols, polyisocyanates and water in the presence of catalysts and surface active agents acting as foam stabilizers.

The improvement of this invention is generally applicable to prior art manufacturing processes for such foams, including those wherein the foaming is effected in the presence of additional agents or additives such as expanding or blowing agents, pigments, softeners and the like.

The production of elastomeric polyurethane foams from polyols, polyisocyanates and water in the presence of catalysts and foam stabilizers is well known in the art and has gained increasing importance during the last decade. The production of such foams from the reactants referred to is, for example, described in detail in "Polyurethanes," by Saunders and Frisch, Interscience Publishers, 1962. The stabilization of such foam is customarily effected by surface active agents which primarily consist of certain polyether-modified polysiloxanes. Such foam stabilizers are, for example, disclosed in British Patent 892,136.

It has previously been suggested to add to the reaction mixture for such foams certain solid, water-insoluble, high-molecular compounds which upon dispersion within the foaming reaction system cause collapse of the cellular or pore structure of the foam within certain limited zones and regions. The admixture of such compounds, hereinafter referred to as "pore regulators," thus creates an irregular cellular pattern in the foam, resembling that of natural sponge. These prior art pore regulators are usually incorporated into the reaction mixture in paste form. Experience has demonstrated that such pore regulating pastes are difficult to handle, oftentimes do not yield the desired results and generally are not satisfactory from a practical point of view. It is thus extremely difficult to distribute the pastes in a controlled manner within the foaming system and the incorporation of the pastes into the system without affecting the orderly progress of the foaming operation proper requires additional cumbersome and thus expensive measures during the foaming operation, such as blowing with air and the like. For this reason, the applicability of such pore regulators is very limited. The presence of these prior art pore regulating pastes also necessitates a significant increase of the concentration of the foam stabilizing surface active agents in the system, i.e., for example, the usually employed water-soluble, polyether-modified silicone oils. An increase in the concentration of the foam stabilizer in the system is, of course, undesired from an economical point of view.

Accordingly, it is a primary object of this invention to provide for a foaming process for the production of polyurethane foams of the indicated kind with an irregular pore pattern, which process effectively overcomes the drawbacks of the prior are processes referred to.

It is also an object of this invention to provide an improvement in prior art foaming processes for the production of polyurethane foams from polyols, polyisocyanates and water which enables effective control of the pore and cellular pattern of the foam throughout its structure.

Another object of this invention is to provide a process of the indicated kind which enables the formation of larger or smaller pores in a controlled manner throughout the foam structure or within restricted zones thereof and which also renders possible the formation of zones wherein the foam is collapsed.

Another object of this invention is to provide for a foaming process which is carried out in the presence of both a foam stabilizer and a pore regulating agent of a novel kind to obtain a foam which has a controlled cellular pattern and resembles the cell structure of natural sponge.

Another object of this invention is to provide a process of the indicated kind which is simple to carry out without elaborate equipment and which can be performed at the customary concentrations of foam stabilizers.

Generally it is an object of this invention to improve on the art of polyurethane foam production as presently practiced.

Briefly, the foaming with polyols, polyisocyanates and water in the presence of catalysts and surface active foam stabilizers is carried out, in accordance with this invention, in the presence of pore regulators in the form of liquid organopolysiloxanes having terminal OH groups or groups which readily hydrolize under the conditions which prevail in the foaming system. Such organopolysiloxanes are eminently suitable for effectively controlling and adjusting the pore or cellular structure of the foam.

The organopolysiloxanes of the indicated kind are added to the foaming system in liquid or moderately viscous form. It should be emphasized at this point that the organopolysiloxanes which are admixed with the foaming system in accordance with this invention do not exert any foam stabilizing activity but their effect is in fact to the contrary since they have a pronounced foam destroying activity causing the foam to collapse in those regions or zones where the organopolysiloxanes are effectively incorporated into the system. The inventive pore regulating effect of the organopolysiloxanes is rather contingent on the presence of surface active foam stabilizers such as the prior art water-soluble polyether-modified silicone oils. Successful foaming with the inventive organopolysiloxanes in the absence of surface active foam stabilizers would not be feasible.

The organopolysiloxanes which are employed in accordance with this invention as pore regulators may be generically represented by the average Formula A (A) $\quad R_x SiZ_y O_{2-1/2(x+y)}$ In this formula, R stands for hydrocarbon, including substituted hydrocarbon; preferably, R is methyl, ethyl, vinyl or phenyl. In a preferred embodiment, the predominant portion of all R groups which are part of the difunctional siloxane units

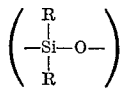

is methyl. Z is OH,

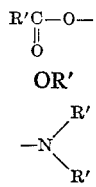

or

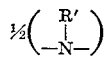

wherein R' stands for hydrogen or hydrocarbon, preferably methyl or another lower alkyl; $x$ has a value of from 1.0 to 2.1, preferably 1.85 to 2.0; $y$ has a value of from 0.01 to 1.0, preferably 0.05 to 0.3; and $x+y$ is equal to 1.55 to 3, preferably 1.9 to 2.1.

As stated hereinabove, Z may be OH, in which event the polysiloxanes could generically be represented by the Formula I (I) $\quad R_x Si(OH)_y O_{2-1/2(x+y)}$ wherein R, y and x have the above-indicated meaning.

However, as will be realized from the definition of Formula A above, the organopolysiloxanes may instead have terminal groups which are readily hydrolizable under the conditions of the foaming process, to wit, the terminal groups may consist of acyloxy of the formula

the alkoxy group

OR' or the amino groups

or

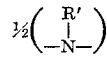

wherein R' has the above meaning.

Mixtures of such terminal groups come also into consideration. This means that the organopolysiloxanes may contain, for example, terminal OH groups which are partially replaced by one or several of the other indicated terminal groups.

The pore regulating compounds are preferably employed in the form of aqueous solutions or dispersions if the amount of such hydrolizable groups, to wit, the acyloxy, alkoxy or amino groups, is greater than the portion of SiOH groups in the polysiloxane.

The generic Formula A above embraces, for example, compounds of the Formula II.

(II)
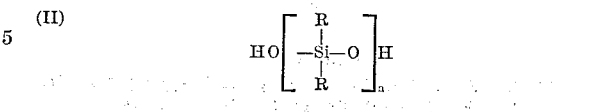

wherein R has the above meaning and $n$ has a value of from between 2 to 300, preferably between 10 and 300.

Preferred compounds of the generic Formula A are, however, compounds of the general Formula III:

(III)
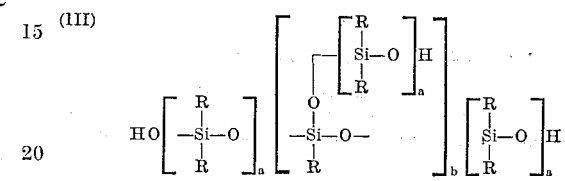

In this Formula III, $a$ has a value of from 1 to 20, preferably 3 to 10, and $b$ has a value of from 1 to 20, preferably 1 to 10.

With a view to achieving reliable reproductibility of the intended results, it is advantageous that the inventive pore regulating organopolysiloxanes are employed in equilibrated or almost equilibrated state. For the purposes of this application, the term "equilibrated state" is deemed to mean that the distribution of the different structural units in the polysiloxane skeleton and also the molecular weight distribution of the polymeric mixture conform or almost conform to the statistical equilibrium.

The preparation of the pore regulating polysiloxanes to be employed in accordance with this invention has been disclosed, for example, in U.S. patent application Ser. No. 384,530 filed July 22, 1964, presently still pending.

The pore regulating polysiloxanes of this invention are liquid, oil-like substances of moderate viscosity. For the purposes of this invention, those polysiloxanes are preferred which at normal or room temperature exhibit a viscosity of less than 1,000 cp.

As contrasted to the prior art paste-like products, the polysiloxanes to be used in accordance with this invention are readily incorporated into the foaming system and the results are reproducible in a reliable manner. The concentration of foam stabilizers in the system need not be increased in spite of the presence of the inventive polysiloxanes. The field of applicability is also much broader than that for the prior art compounds. Not only sponge-like pore structures can thus be easily obtained by the admixture of the inventive polysiloxanes, but uniform pore enlargement can also readily be achieved. The nature and magnitude of the pore changing effect are, of course, largely dependent on the specific foam formulation. Moreover, the manner of incorporating the polysiloxanes into the reaction mixture and the concentration of the polysiloxanes in the mixture are factors to be considered. These factors have to be determined for the individual systems. Generally speaking, it may be stated that the effect is the stronger and also the more restricted to a particular zone within the foam mixture, the less intense the mixing of the polysiloxane with the remaining reaction components. Thus, if the liquid organopolysiloxane is added to a particular zone of the reaction mixture and is not thoroughly and homogeneously distributed throughout the system, local enrichment of the polysiloxane within said zone will take place which causes a greater foam regulating effect than in those regions of the system which are reached by lesser amounts of polysiloxane. An irregular pore pattern effect is primarily desired in the production of sponge-like foams. Such sponges should contain zones of very fine pore structure and other zones in which the foam has completely collapsed. By properly distributing the liquid polysiloxane in a non-uniform manner through the system, such result is readily and successfully achieved.

For other purposes, a more uniform pore structure is desired in which the pores are slightly enlarged, i.e. the pore structure is coarser. This can also be obtained by the inventive pore regulators. The use of the foam stabilizers which are presently available on the market generally results in the formation of a very fine pore structure. While this is desirable for many purposes, there are situations in which such fine pore structure is disadvantageous. This applies, for example, to foaming in molds, wherein a very fine pore structure results in insufficient stability of the final foam. Thus, extended fissures, cracks and crazes may formed in the foam structure. This phenomenon is also well known from block foaming. The formation of such fissures, cracks and crazes is effectively prevented by the addition of small proportions of the inventive polysiloxanes. The addition of the pore regulators causes the formation of a slightly coarser foam with increased stability of the cell walls. The uniform distribution of the inventive polysiloxanes within the reaction mixture is facilitated by the presence of the terminal groups, particularly the hydroxyl groups, which cause the organopolysiloxane, which otherwise is incompatible with water or polyol, to disperse within the system. It has also been established that the incorporation of the inventive polysiloxanes as dispersions in softeners, as for example phthlates or phosphoric acid esters, gives excellent results, if the thus enriched softeners are then added to the foaming mixture.

Applicant does not want to be limited by any theories advanced by him, but it is believed that the inventive effect is predicated on the following phenomenon:

It is assumed that the polysiloxanes, which are low-molecular compounds, displace the foam stabilizer at and from the boundary surface and that they react, during the foaming procedure, with isocyanates under formation of higher molecular and, in some instances, resin-like solid and incompatible organopolysiloxanes. These reaction products cause then a local collapse of the foam. The collapsing effect is the stronger the higher the concentration of the inventive polysiloxanes and the more irregular, that is, the more sponge-like, the more non-uniform the siloxane distribution throughout the system.

The above explanations will enable a person skilled in this specialized field correctly to utilize the inventive pore regulators for the indicated purpose. Experience has demonstrated that for the purpose of obtaining a uniform and relatively insignificant enlargement of the pore structure, generally 0.001 to 0.01 part by weight of inventive polysiloxane per 100 parts by weight of polyol are sufficient. However, with a view to obtaining a sponge-like structure having collapsed foam areas, larger amounts of the organopolysiloxanes should be used which generally should be in the range of 0.01 to 0.15 part by weight of organopolysiloxane per 100 parts by weight of polyol.

The pore regulating effect of the inventive organopolysiloxanes is particularly pronounced in one-step foaming processes.

Both polyethers and polyesters may be used as polyols, but polyethers are preferred. As examples, there may be mentioned the polymerizates of, for example, propylene oxide, 1,2-, 1,3- and 2,3 butylene oxide, styrene oxide, and epichlorohydrin. Further, the addition products of the above oxides with di- or multivalent alcohols and phenols, formed in alkaline or acidic media, are also suitable reactants. Such alcohols and phenols may be exemplified by ethylene glycol, diethylene glycol, polyethylene glycols, propanediol-(1,2), propanediol-(1,3), butanediols, alkanediols, butene-2-diol-(1,4), butane-2-diol-(1,4), glycerin, butanetriols, hexanetriols, pentaerythrite, trimethylol propane, hydroquinone, 4,4'-dioxydiphenylmethane, 4,4'-dioxydiphenyldimethylmethane, 4,4' - dioxydicyclohexylmethane, 4,4'-dioxydicyclohexylmethane, 4,4'-dioxydicyclohexyldimethylmethane and dioxynaphthaline. Moreover, the addition product of these oxides with mono- or polyamines of aliphatic or aromatic nature having several active hydrogen atoms as well as with aminoalcohols such as ethanolamine, N-alkylethanolamines, diethanolamine, N - alkyldiethanolamines, triethanolamine, ethylenediamine, aniline, tetra- or hexamethylenediamine, and diethylenetriamine, come into consideration.

Further, the addition product of such oxides with compounds with several hydrogen atoms which are capable of adding alkyleneoxide groups, as for example sugar or castor oil, are embraced.

In the mixture of the substituted ethylene oxides, ethylene oxide may also be used as mixing component in the polymerization or addition up to about 30%. In doing so, the incorporation of the ethylene oxide may be effected both by mixed polymerization and also by subsequent addition polymerization.

These polyalkyleneglycolethers may also be employed in mixture with other multivalent hydroxyl compounds as, for example, in mixture with ethylene glycol, 1,4-butylene glycol, glycerin, trimethylolpropane, pentaerythrite, tartaric acid esters, castor oil and the like. The foaming may also be performed with mixtures of such compounds or with such mixtures which additionally contain polyesters.

The following examples are given for compounds containing isocyanate groups: aliphatic, araliphatic or aromatic polyisocyanates, as, for example phenylene diisocyanates, 2,4- or 2,6-toluylene diisocyanate, diphenylmethane, 4,4'-diisocyanate, diphenyl-4,4'-diisocyanate, 1,5-naphthylene diisocyanate, hexamethylene diisocyanate or decamethylene diisocyanate. Further, the addition products of polyisocyanates and alcohols which contain free NCO groups, are suitable. The following compounds may be mentioned as examples for such alcohols: trimethylolpropane, glycerin, hexanetriols, glycols. Further, the addition products of polyisocyanates and lower polyesters or castor oil come into consideration. Moreover, the reaction products of the above isocyanates with acetals according to German Patent 1,072,385 as well as the isocyanates mentioned in German Patents 1,022,789 and 1,027,394 may be used. Of course, mixtures thereof may also be employed.

The invention will now be described by several examples, it being understood, however, that these examples are given by way of illustration and not by way of limitation and that many changes may be effected without affecting in any way the scope and spirit of this invention as recited in the appended claims.

INTRODUCTION TO EXAMPLES

In the following examples, the polyurethane foams were produced as follows: 99.9 parts by weight of a polyether, obtained by the addition of propylene oxide to glycerin, and having a hydroxyl number of 54.5 were well mixed with 0.1 part by weight of dibutyltindilaurate as catalyst. The polyether-dibutyltindilaurate mixture was thereafter stirred with a solution of 0.2 part by weight of triethylenediamine and 1 part by weight of a water soluble silicone oil in 3.6 parts by weight of water. The silicone oil was the foam stabilizer. This foam stabilizer corresponded to the following formula:

(IV)

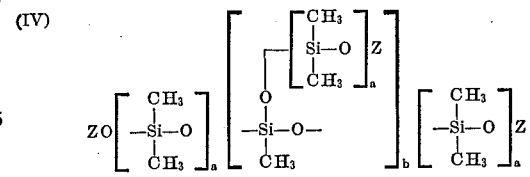

In this formula, $a = 6.2$ and
$b = 3$;

ZOH is an addition product of a mixture of 60% by weight of propylene oxide and 40% by weight of ethylene oxide with n-butanol. The average molecular weight of the compound was 1,720. Finally, and during strong agitation by means of a disc stirrer with cup-like depressions, 47.2 parts by weight of toluylene diisocyanate (2,4 and 2,6 isomers in the ratio 80:20) were added to the system. The agitator operated at a speed of about 3,500 r.p.m. The foaming mixture was poured into a carton or box and after completion of the reaction was hardened in a drying oven at about 120° C. 400 g. polyether were used for each of the foaming tests. The foam body or block thus obtained had a base surface of 28·28 cm.

The particular catalysts, as identified hereinabove, could be substituted for different catalysts in equivalent amounts so as to obtain the same effect. Thus, stannous octoate and N-ethylmorpholine could be used instead.

It has, however, to be considered that generally the use of stannous octoate somewhat diminishes the irregular sponge-like pore enlargements when the same quantities of siloxanes according to the invention are used compared with the same quantities of dibutyltindilaurate, that means the use of catalytically equivalent quantities with respect to the reaction of polyether and isocyanate. This effect can be equalized when using greater quantities of siloxane according to the invention. In general, it has to be noted that the effect of the siloxanes according to the invention is pronounced the more the concentration contains tin catalysts in the foam deposit formation. The concentrations of tin catalysts of the process according to the invention do, however, not exceed the usual range.

Example I

In this test series, a pore regulator in the form of a polysiloxane of the general Formula V was used:

(V)
$$HO\left[\begin{array}{c}CH_3\\|\\Si-O\\|\\CH_3\end{array}\right]_c\left[\begin{array}{c}O\\|\\-Si-\\|\\CH_3\end{array}\left[\begin{array}{c}CH_3\\|\\Si-O\\|\\CH_3\end{array}\right]_c H\right]_d\left[\begin{array}{c}CH_3\\|\\-Si-O-\\|\\CH_3\end{array}\right]_e H$$

wherein $c=6.17$ and $d=3$. This substance was either carefully premixed in the polyether to form a dispersion of 0.4% concentration by weight (alternative (1)) or was directly incorporated into the reaction mixture just prior to the addition of the isocyanate (alternative (2)).

The results of the test series are tabulated in Table I below.

TABLE I

| Parts by weight of OH-siloxane per 100 parts by weight of polyether | Manner of incorporation alternative (1) or (2) | Foam height in cm. | Pore structure | Average diameter of the sponge holes in mm. |
|---|---|---|---|---|
| 0.001 | (1) | 23 | Fine pores | |
| 0.001 | (1) | 23 | As compared to the preceding test, slightly enlarged in a uniform manner. | |
| 0.01 | (1) | 23 | Slightly coarser pores with uniform enlargement. | |
| 0.02 | (1) | 21.5 | Traces of sponge structure. | 2.2 |
| 0.02 | (2) | 20 | Sponge structure | 10.5 |
| 0.04 | (1) | 21 | Weakly pronounced sponge structure. | 4.1 |
| 0.07 | (1) | 19.5 | Sponge structure | 7.8 |
| 0.15 | (1) | 20 | do | 14.0 |

Example II

The polysiloxane of Example I with terminal hydroxyl groups was replaced by the analogous substance, wherein the hydroxyl groups were replaced by terminal acetoxy groups. 0.02 part by weight of this polysiloxane per 100 parts by weight of polyether were added to the system without any mechanical mixing. In this manner, a uniform foam of a relatively coarser pore structure was obtained. The height of the foam was 22.5 cm.

Example III

The procedure of Example II was repeated, but the same amount of the polysiloxane with terminal acetoxy groups was first dissolved in the aqueous foam stabilizer solution and the thus enriched foam stabilizer solution was then added to the system. In this manner, a sponge-like foam of about 22 cm. height was obtained. The amount of triethylenediamine was increased to 0.22 part by weight.

While specific embodiments of the invention have been shown and described in detail to illustrate the application of the inventive principles, it will be understood that the invention may be embodied otherwise without departing from such principles.

Example IV

The procedure of Example I was repeated with a pore regulator of the general Formula V but wherein are $c=6,7$ and $d=5$. 0.04 weight percent of this substance were used as a 1% dispersion in the polyol used in the foaming process. A foam having a height of 21 cm. with a distinguished sponge structure was obtained (average diameter of the sponge holes was 8 mm.). When using a pore regulator of Formula V ($c=5,5$, $d=2$) in which 5% of all OH-groups are replaced by $$-N\begin{array}{c}C_2H_5\\ \\C_2H_5\end{array}$$

similar results were obtained.

What is claimed is:
1. In a foaming process for preparing elastomeric polyurethane foam from a reaction mixture of polyols, organic polyisocyanates and water, said polyols being selected from the group consisting of polyether polyols and polyester polyols wherein the foam is stabilized by a surface active agent admixed with said reaction mixture, the improvement which comprises that said reaction mixture, in addition to said foam stabilizing surface active agent, is admixed with a minor amount of a pore regulator for the foam, said pore regulator being liquid organopolysiloxane having a viscosity at room temperature of less than 1,000 cp. and being of the average formula

$$R_xSiZ_yO_{2-x+y/2}$$

wherein
R is hydrocarbon;
Z is selected from the group consisting of (a) OH (b) $R'C-O-$
        $\|$
        $O$ wherein R' is selected from the group consisting of hydrogen and hydrocarbon, (c) OR' wherein R' has the above meaning, except hydrogen, (d) $-N\begin{array}{c}R'\\ \\R'\end{array}$ wherein R' has the above meaning, and
(e) mixtures of (a) (b) (c) and (d);
 $x$ has a value of between 1.0–2.1;
 $y$ has a value of between 0.01–1.0 and
 $x+y=1.55-3$.

2. The improvement of claim 1, wherein R is selected from the group consisting of methyl, ethyl, vinyl and phenyl, $x=1.85-2.0$, $y=0.05-3$, and $x+y=1.9-2.1$.

3. The improvement of claim 1, wherein R' is lower alkyl.

4. The improvement of claim 1, wherein said liquid organopolysiloxane is admixed with said reaction mixture in the form of an aqueous solution.

5. The improvement of claim 1, wherein said liquid organopolysiloxane is admixed with said reaction mixture in the form of a dispersion in polyol.

6. The improvement of claim 1, wherein said organopolysiloxane has the formula

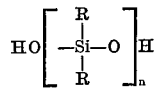

wherein R has the above meaning and $n$ has a value of between 2 and 300.

7. The improvement of claim 1, wherein the organopolysiloxane has the formula:

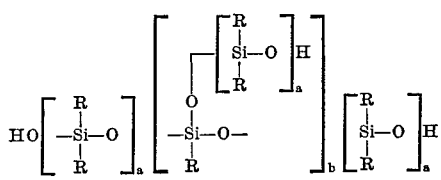

wherein R has the above meaning, $a=1-20$ and $b=1-20$.

8. The improvement of claim 7, wherein R is selected from the group consisting of methyl, ethyl, vinyl and phenyl, $a=3-10$ and $b=1-10$.

9. The improvement of claim 1, wherein about 0.001 to 0.15 part by weight of said organopolysiloxane per 100 parts by weight of polyol are added to the reaction mixture.

10. In a foaming process of forming polyurethane foam, the step of incorporating into the foaming mixture a minor amount of a pore regulator in the form of liquid polysiloxane of the average formula $$R_xSiZ_yO_{2-x+y/2}$$

wherein
R is hydrocarbon;
Z is selected from the group consisting of
(a) OH,
(b)

wherein R' is selected from the group consisting of hydrogen and hydrocarbon,
(c) OR', wherein R' has the above meaning except hydrogen
(d)

wherein R' has the above meaning,
(e) mixtures of (a) (b) (c) and (d);
    $x$ has a value of between 1.0–2.1;
    $y$ has a value of between 0.01–1, and
    $x+y=1.55-3$.

11. The improvement of claim 7, wherein the R-residues essentially consist of $CH_3$.

12. In a foaming process for preparing flexible polyurethane foam by reaction of polyols, organic polyisocyanates and water in the presence of catalysts and surface active foam stabilizers, the improvement which comprises that the foaming is carried out in the presence of a pore regulator in the form of a liquid organopolysiloxane devoid of foam stabilizing effect and having a viscosity at room temperature of less than 1,000 cp., said organopolysiloxane corresponding to the formula

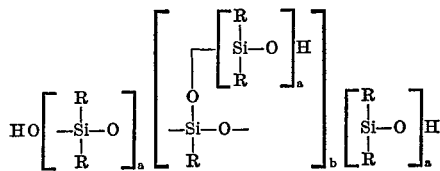

wherein R is selected from the group consisting of methyl, ethyl, vinyl and phenyl, $a=1-20$ and $b=1-20$.

References Cited

UNITED STATES PATENTS

| | | | |
|---|---|---|---|
| 3,243,475 | 3/1966 | Reischl et al. | 260—2.5 |
| 3,272,762 | 9/1966 | Ibbotson et al. | 260—2.5 |
| 3,278,465 | 10/1966 | Twitchett et al. | 260—2.5 |

FOREIGN PATENTS

| | | |
|---|---|---|
| 1,122,698 | 1/1962 | Germany. |
| 973,234 | 10/1964 | Great Britain. |

DONALD CZAJA, *Primary Examiner.*

H. S. COCKERAM, *Assistant Examiner.*